July 3, 1923.

L. F. J. DIXEN 1,460,371

MACHINE FOR PREPARING BUTTERED BREAD

Filed May 27, 1920     2 Sheets-Sheet 1

Inventor.
Laue Frederik Johannes Dixen,
By
          atty.

July 3, 1923.

L. F. J. DIXEN 1,460,371

MACHINE FOR PREPARING BUTTERED BREAD

Filed May 27, 1920    2 Sheets-Sheet 2

Inventor
Laus Frederik Johannes Dixen
By [signature] Atty.

Patented July 3, 1923.

1,460,371

UNITED STATES PATENT OFFICE.

LAUE FREDERIK JOHANNES DIXEN, OF FREDERIKSBERG, NEAR COPENHAGEN, DENMARK.

MACHINE FOR PREPARING BUTTERED BREAD.

Application filed May 27, 1920. Serial No. 384,674.

*To all whom it may concern:*

Be it known that I, LAUE FREDERIK JOHANNES DIXEN, a subject of the King of Denmark, residing at Frederiksberg, near Copenhagen, in the Kingdom of Denmark, have invented certain new and useful Improvements in Machines for Preparing Buttered Bread; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to machines for mechanically preparing buttered bread in large quantities. The feature of the present invention consists in mechanically applying the butter previously to or partly simultaneously with the cutting-off of the slice of bread, so that instead of a crumbling slice of bread, a cut surface of the solid bread is submitted to the action of the members spreading the butter or the like. Preferably the spreading of the butter and the cutting of the bread, or one of these operations is performed during a rotary movement of the bread, or of the spreading or the cutting devices relatively to the bread, and simultaneously with the spreading of the butter the edges of the cut surface are scraped off, so as to remove any butter or the like therefrom, which during the spreading may have been spread beyond such edges.

In the accompanying drawing is shown, by way of example, a machine which, operating after the aforesaid principles, will serve to prepare buttered bread in the manner described.

In this drawing—

Figure 1:
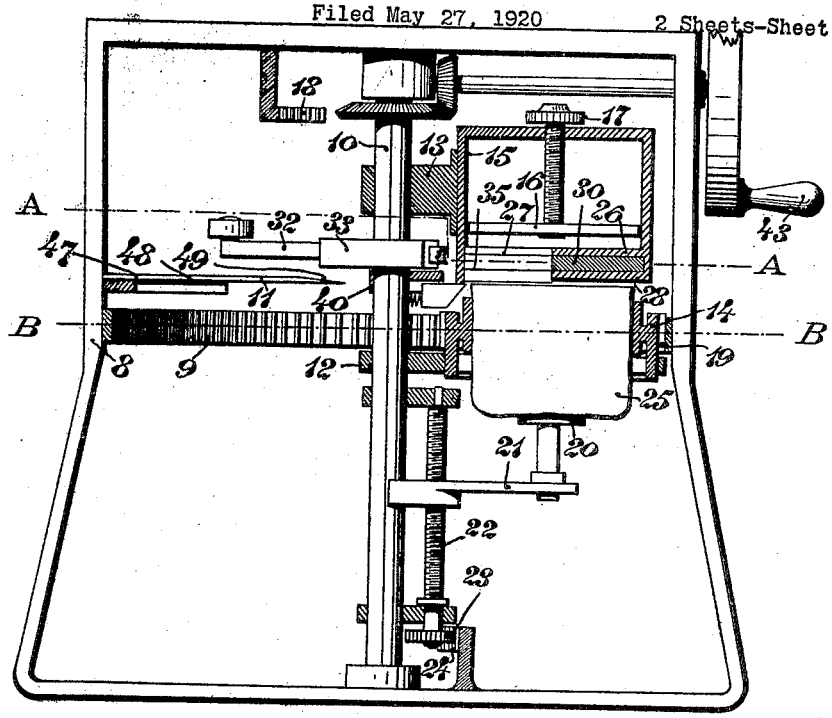
Fig. 1 is a vertical section through the machine, showing its principal parts.

The machine shown in the drawing consists of an upright stand 8 having a horizontal internally toothed flange 9. Coaxially to this toothed flange is disposed a vertical shaft 10. To the wall of the stand 8 is secured a horizontal knife 11, having an eccentric edge. To the shaft 10 are fitted arms 12 and 13, which carry a revoluble bread-holder 14 and coaxially thereto a butter-container 15, respectively. In the butter-container is disposed a plunger 16, the stem of which is threaded, and carries an axially immovable nut in the form of a pinion 17, which during part of the rotation of shaft 10 will mesh with a toothed sector 18, fixed to the upper part of the stand whereby the plunger 16 is screwed down a given distance in the butter-container, this depression of the plunger corresponding to the amount of butter to be dispensed at each revolution for being spread on each slice of bread. Beneath the bread-holder, which is provided with a gear flange 19 on its outside meshing with the internally toothed flange 9, is provided a step-disc 20, which is revolubly fitted in an arm 21. This arm 21 is mounted on a screw 22, which is rotatable but not axially movable in bearings on the shaft 10, and parallel to same. To the lower end of this screw 22 is secured a pinion 23, which during a part of the rotation of the shaft 10 meshes with a toothed sector 24 fitted to the base of the stand, so that the said screw 22 is turned and the step-disc 20, and with it the bread 25 is pushed upwards a distance corresponding to the thickness of the slice to be cut off.

Figure 2:
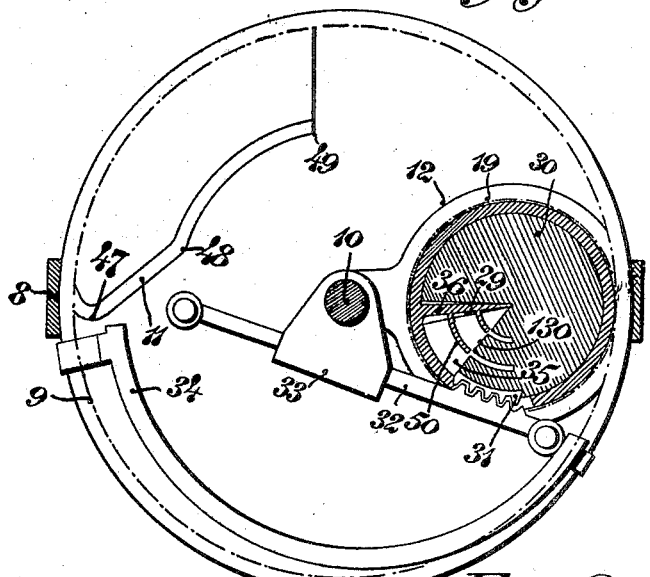
Fig. 2 is a plan of the machine as seen below the line A—A in Fig. 1.
Figure 4:
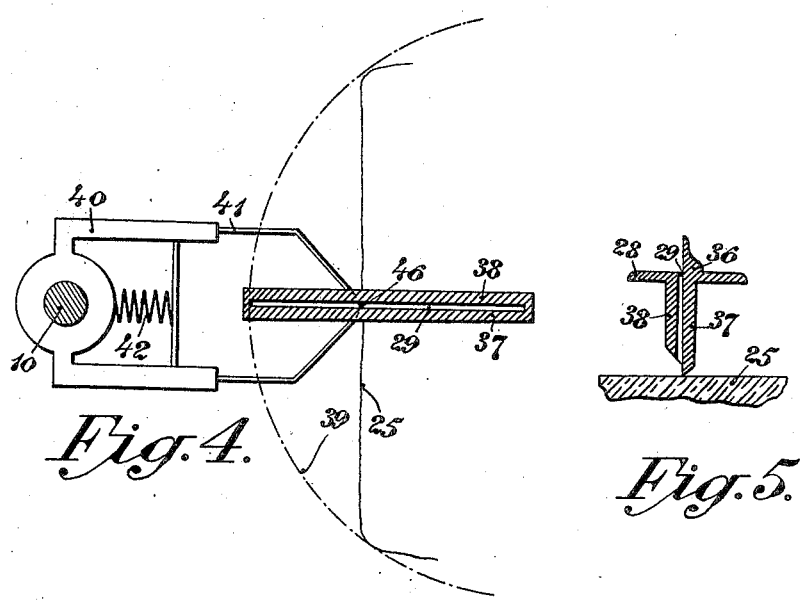
Figure 4 is an enlarged detail plan view of the butter dispensing mechanism.
Figure 5:
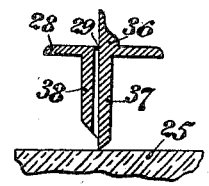
Figure 5 is transverse vertical section of the dispensing channel shown in Figure 4.

In the butter-container are provided two bottoms, of which the upper one 26 is partly cut away at 27, whilst the lower bottom 28 has a radial slot 29, Figs. 2 and 5. Between these two bottoms is disposed a disc 30 having a toothed segment 31, meshing with a rack 32, the carrier 33 of which is fitted to the shaft 10. During the rotation of the latter alternately one or the other end of said rack-bar 32 will be brought under the action of an eccentric cam 34 fitted to the stand 8, so that the disc 30 will be turned through a given angle, alternately clockwise and counterclockwise. The disc 30 is cut away at 35, and into this gap the butter is forced, under the action of the plunger 16, through the gap 27 in the upper bottom 26. A ridge 36, formed on the bottom 28, projects upward through the gap 35 at one side of the slot 29. The edge 130 of disc 30 at the gap 35 acts as a press against the butter between it and the ridge 36, and when, therefore, the disc 30 is turned clockwise, the butter is forced out through the slot 29. To the underside of this slot are provided two projecting lips 37, 38 of unequal length. The longer lip 37 reaches down to the surface of the bread, whilst the other lip 38 terminates at a short distance therefrom. The length and position of the lips 37, 38 must be arranged so that they cover a radius of the circle 39, which encircles the bread, Fig. 4.

Beneath the carrier 33 on the shaft 10, Fig. 1, is fixed a carrier 40 for a cup shaped receptacle 41 which is placed partly under the slot 29 and which, by aid of a spring 42 or the like, is held up against the side of the bread close to the cut surface thereof.

Figure 3:
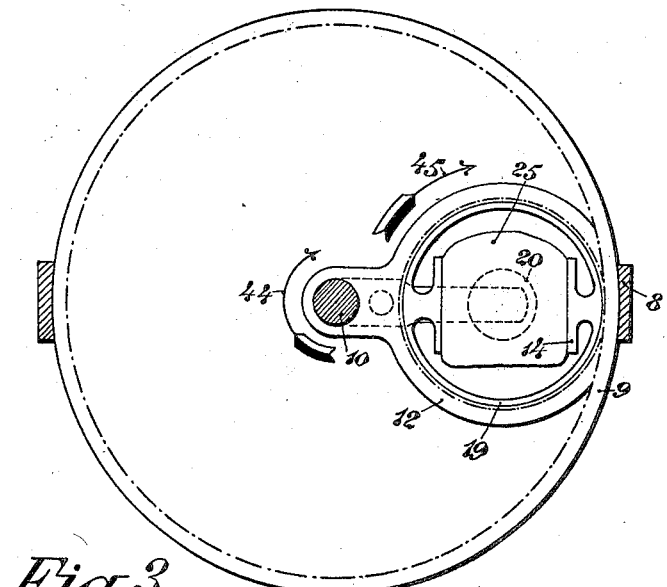
Fig. 3 is a plan of the machine as seen below the line B—B in Fig. 1.

When the machine is operated by the shaft 10 being rotated by means of the crank 43, a motor or the like, and revolving in the direction indicated by the arrow 44 in Fig. 3, the spreading of the butter will begin each time the several parts are in the position as shown in the drawing. The rack 32 will be under action of the eccentric cam 34 and turn the disc 30 clockwise, whereby the butter in the gap 35 is forced out through the slot 29, and passes along the lip 37, so that it is applied to the surface of the bread. By the meshing of the toothed flanges 9 and 19 the bread is rotated on its own axis in the direction indicated by the arrow 45 in Fig. 3. A portion of the butter forced out, during a complete rotation of the bread which takes place during one third of a revolution of the shaft 10, will cover the surface of the bread at a given thickness; and a portion of the butter will pass into the cup 41, when the slot 29 extends beyond the edge of the bread, as shown in Fig. 4. The point 46 of the cup bearing against the bread, or a special member fitted to the cup or the like will act as a scraper, so that the butter spread on the surface of the bread will be sharply limited, and the buttered bread will present a nice appearance.

After the buttering has been wholly or partly completed, the revolving bread comes within the range of the knife 11, the eccentric cutting edge of which proceeds from a point 47, where it meets the circle 39, to a point 48, which, during the further rotation of the bread will approximately, coincide with the center of the said circle. The angle between the points 47 and 48 may be so large, that the bread, while passing through this angle, will perform a complete revolution on its axis. The angle may, however, also be smaller, and in continuation of the eccentric cutting edge 47—48 a more or less concentric edge 48—49 may be provided. The action of the knife on the bread passing along it whilst being rotated on its axis, is favorable for producing a smooth and perfect cut. The slice of buttered bread thus cut off may remain on the knife, or be passed onto a table or other support or conveyor provided in combination therewith.

Immediately after, or during the cutting process the other end of the rack 32 will come under action of the cam 34 and turn the disc 30 so that the edge 130 is removed away from the ridge 36 and the gap 35 is again open to receive a fresh supply of butter, when the plunger 16 in the butter-container is screwed down by the co-operation of the pinion 17 and the toothed sector 18. Simultaneously herewith, or during the further rotation of the shaft 10 the bread will, by the co-operation of the toothed sector 24 and the screw 22, 23, be raised a distance corresponding to the slice cut off, so that the lip 37 again comes into contact with the freshly cut surface, and another buttering operation may commence.

In order that the butter be not too excessively pressed out through the slot 29 at the outside of the gap 35, so that it is spread thinner on the center of the bread than on the circumference, the gap may be provided with one or more bent, concentrical walls 50, Fig. 2, which project from the ridge 36, and for which corresponding slots are provided in the disc. Thereby two or more chambers are formed, each having its own plunger.

The various details described are immaterial as regards the invention and may be varied in different ways. The various co-operating parts may, either separately or combined, be replaced by technically equivalent parts, and may be made to co-operate in a technically equivalent manner, for example, also the reversed manner of the one shown.

I claim:

1. A machine for slicing and buttering bread, comprising a butter container, a butter discharging mechanism in the container, a bread holder beneath the container, means for advancing bread in the holder, a stationary slicing knife, and means for rotating the bread holder along the knife and simultaneously actuating the butter discharging mechanism.

2. A machine for slicing and buttering bread, comprising a bread holder, a butter container, a butter discharging mechanism arranged coaxially with the holder, means for rotating the holder and discharging mechanism with respect to one another, a stationary slicing knife, means for moving the bread holder along the knife whereby the bread is sliced, and means for actuating the discharging mechanism during the movement of the holder.

3. A machine for slicing and buttering bread, comprising a bread holder, a butter container arranged coaxially with the holder, said container having a discharge slot arranged along a radius of a circle circumscribing the end surface of the bread in the holder, means to force butter through said slot, a slicing knife and means for revolving the holder and simultaneously rotating it on its axis.

4. A machine for slicing and buttering bread, comprising a bread holder, a butter container arranged coaxially with the latter, said container having a discharge slot arranged along a radius of a circle circumscribing the bread in the holder, means to force the butter through said slot, and a butter receiving receptacle adapted to automatically move longitudinally of the slot, for the purpose specified.

5. A machine for slicing and buttering bread, comprising a bread holder, a butter container arranged coaxially with the latter, said container having a discharge slot arranged along a radius of a circle circumscribing the bread in the holder, means to force the butter through said slot, a butter receiving receptacle movable longitudinally of the slot, a stationary slicing knife, means for moving the holder along the knife, and means for simultaneously rotating the holder on its axis.

6. A machine for slicing and buttering bread, comprising a bread holder, means for advancing a loaf of bread therein, a butter container arranged coaxially with the holder, said container having a discharge slot along a radius of a circle circumscribing the bread in the holder means to force butter through the slot, a butter receiving receptacle movable longitudinally of and beneath the slot, and a scraper on the receptacle adapted to bear against the edge of the bread.

7. In a machine for slicing and buttering bread, a rotary shaft, a bread support carried by the shaft, a butter container carried by the latter and arranged coaxially with the holder, means for axially rotating the holder during its movement by the shaft, a stationary knife mounted in the path of the bread carried by the holder, and a butter discharging mechanism in the container operable by the movement of the container with the shaft.

8. In a machine for slicing and buttering bread, a rotary shaft, a butter container carried thereby, a plunger in the container, means operated by the movement of the container for actuating the plunger, superposed slotted plates in the bottom of the container, means operated by the movement of the container for axially rotating one of the plates, and lips of unequal length depending from the lower plate and forming a discharge passage communicating with the slots in the plates.

9. In a machine for slicing and buttering bread, a rotary shaft, a butter container carried thereby, a plunger in the container, means operated by the movement of the latter for depressing the plunger, superposed plates mounted in the bottom of the container and having registering radial slots, a ridge on the bottom plate projecting through the slots of the superposed plates, lips of unequal length depending from the bottom plate and forming a discharge passage communicating with slots of the plates, and means operated by the movement of the container for axially rotating the middle one of the superposed plates.

In testimony that I claim the foregoing as my invention, I have signed my name.

LAUE FREDERIK JOHANNES DIXEN.